3,398,120
POLYESTERS OF DIACID HALIDE, ALKYL
BISPHENOL AND GLYCOL
Raymond R. Hindersinn, Lewiston, and Edward J. Quinn, Tonawanda, N.Y., assignors to Hooker Chemical Corporation, Niagara Falls, N.Y., a corporation of New York
No Drawing. Filed July 16, 1963, Ser. No. 295,504
8 Claims. (Cl. 260—47)

This invention relates to linear polyesters and more particularly to linear polyester molding compounds wherein one of the reactants is a bisphenol derivative.

High molecular weight linear polycarbonate compositions based on bisphenols have been shown to be useful in the preparation of films and fibers. Further, these compounds, when molded into useful articles using conventional techniques, offer properties superior to those articles molded from other linear polyester compositions. It has been found, however, that the bisphenol polyisophthalates and terephthalates compositions are difficult to fabricate because of their high melting points and high melt viscosities. For these compositions to be useful as molding compositions, the melt viscosity and melting point should be reduced to a useful molding range without unduly reducing their beneficial physical properties. Indeed, these polymers show melt viscosities far in excess of the range which is generally suitable for conventional injection molding equipment (about 17,000 to 50,000 poises at 300 degrees centigrade). Raising the molding temperature to reduce melt viscosity is not always practical, because most molding equipment is not made to operate at temperatures much in excess of 300 degrees centigrade and higher temperatures pose additional problems. Also, temperatures exceeding about 300 degrees centigrade may also lead to polymer degradation.

There has now been discovered a new composition of bisphenol polyester polymers which possess greatly improved melt viscosities, while substantially retaining the desirable properties which are useful in preparing fabricated articles.

Accordingly, it is an object of this invention to provide new high molecular weight linear bisphenol polyester polymers as well as a process for producing such polymers. Another object is to provide new high molecular weight linear bisphenol polyester copolymers. Another object is to provide improved molding polyesters. Other objects will also become apparent to those skilled in the art upon reference to the following detailed description and the appended examples.

In accordance with this invention a method is provided whereby bisphenol polyester compositions, which it is desired to process above their decomposition points, can be modified to provide polymers with improved melt viscosity behavior and characteristics. The resulting novel polymers can then be fabricated under more practical molding conditions to yield useful molded products.

Also in accordance with this invention, there are provided linear polyester compositions comprised of the residues of diacid halides and bisphenols containing alkyl substitution groups on the aromatic nuclei. The resulting novel polymers have improved melt viscosities over bisphenoldiacid halide polyester polymers for molding applications.

The high molecular weight linear polyesters of the present invention have an intrinsic viscosity of at least 0.4 deciliter of solvent per gram of polymer (dl./g.) and in most cases above 0.6 dl./g. when measured in a solution of symmetrical tetrachloroethane at 30 degrees centigrade. By comparison, polyesters having an intrinsic viscosity of 0.1 dl./g. or less have very low molecular weights and are properly described by the term "resins," with its connotations of brittleness and poor strength.

The bisphenols which are considered for the preparation of the high molecular weight polyesters according to the present invention correspond to the general formula:

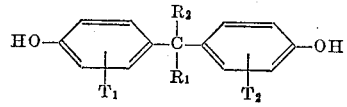

wherein $T_1$ and $T_2$ are alkyl; and $R_1$ and $R_2$ are selected from the group consisting of alkyl, cycloalkyl and phenylene. Substituents $T_1$ and $T_2$ may occur in the ortho or meta positions. The $T_1$ and $T_2$ alkyl groups may contain 1 to 20 carbon atoms and preferably are of from 1 to 6 carbon atoms. Furthermore, these alkyl groups may be normal, branched, and/or halogenated. Groups $R_1$ and $R_2$ may contain from 1 to 20 carbon atoms although it is preferable that they contain 1 to 6 carbon atoms, which may also be halogenated or substituted.

Bisphenols having the above general formula and which are suitable for being employed according to the present invention include:

Isopropylidene-di-ortho cresol;
2,2'-dimethyl-4,4'-dihydroxydiphenyl-2,2-propane;
2,2'-dimethyl-4,4'-dihydroxydiphenyl-2,2-butane;
4,4'-dihydroxy-3-methyl-3'-isopropyldiphenyl-2,2-butane;
3,3'-diethyl-4,4'-dihydroxydiphenylcyclohexylmethylmethane;
2,2'-dipropyl-4,4'-dihydroxydiphenyl-3-methyl-2,2-butane;
3,3'-dimethyl-4,4'-dihydroxydiphenylphenylethylmethane;
3-methyl-3'-propyl-4,4'-dihydroxydiphenylphenylmethylmethane; and
2,3'-dimethyl-4,4'-dihydroxydiphenylphenylethylmethane.

As dicarboxylic acid halides for the reaction there may be used oxalyl chloride and those acid halides of the formula:

$$X-Y-(Z)_n-Y'-X$$

wherein Z is a bivalent or disubstituted radical selected from the group consisting of alkylene, arylene, cycloalkylene, alkylarylene; Y and Y' are independently selected from the group consisting of CO, SO, $SO_2$; and X is halogen. It will be seen that oxalyl chloride is a special case of the above formula where Z has been omitted and $n$ is 0, otherwise $n$ is 1. Additionally, mixtures of the above described dicarboxylic acid chlorides may be employed to achieve a polymer with especially desired properties.

Among aromatic disulfonylhalides which can be used in the polycondensation reaction according to the invention are:

1,4-benzene disulfonyl chloride;
1,3-benzene disulfonyl chloride;
1,2-benzene disulfonyl chloride;
2,7-naphthalene disulfonyl chloride;
4,4'-diphenyl disulfonyl chloride;
4,4'-diphenyloxide disulfonyl chloride;
4,4'-diphenylmethane disulfonyl chloride;
4,4'-diphenylsulfone disulfonyl chloride;
3,3'-diphenylsulfone disulfonyl chloride;
bis-(4-chlorosulfonylphenyl)-2,2'-propane;
4,5-dichloro-1,3-benzene disulfonyl chloride;
4,6-dichloro-1,3-benzene disulfonyl chloride; and
4,5,6-trichloro-1,3-benzene disulfonyl chloride.

Among the diacid halides of dicarboxylic acids which can be used according to the invention are:

Terephthaloyl chloride;
Isophthaloyl chloride;
Sebacoyl chloride;
Adipoyl chloride;
4,4'-diphenylether dicarboxylic acid chloride;

(4,4'-dihydroxydiphenyl-2,2'-propane)bischloroformate;
Ethyleneglycolbischloroformate; and
Fumaryl chloride.

Diacid halides of aromatic monocarboxysulfonic acids include:

m-Chlorosulfonylbenzoyl chloride;
p-Chlorosulfonylbenzoyl chloride; and
2-sulfonylchloride-1-naphthoyl chloride.

Although the preferred chlorides have been listed above, the other halides, especially the bromides but also the fluorides and iodides, may be suitably substituted for the chlorides to obtain good results, too.

It is to be understood that in some instances it may be advantageous to employ both the alkyl substituted bisphenol and a non-alkyl substituted bisphenol in combination to achieve a linear polyester of prescribed melt viscosity for a particular application. Furthermore, in "tailoring" these linear polyesters to particular molding applications it may be desirable to employ mixtures of alkyl substituted bisphenols. The blending of two or more alkyl substituted phenols offers the further advantage that greatly reduced melt viscosities may be obtained, often without substantially departing from the original melting point of the linear polyester polymer.

Further modification of the polymers of this invention may be achieved by the preparation of copolymers which contain the diacid halide and bisphenol of this invention and aliphatic glycol. The glycol may be present in amounts up to about 60 mole percent of the diacid halide although the glycol content will preferably be less than 50 mole percent. The glycols are saturated alkyls containing from 1 to 20 carbon atoms and preferably from 2 to 6 carbon atoms. Suitable glycols include, among others, diethylene glycol, 1,3-butylene glycol, propylene glycol, neopentyl glycol, ethylene glycol, and mixtures thereof. The copolymers are prepared by reacting an excess of diacid halide with glycol under typical esterification conditions until the desired diacid polyester is obtained and thereafter, following the processes of this invention, the diacid polyester and unreacted acid halide are reacted with the bisphenol until the desired molecular weight polymer is obtained. These copolymers permit the preparation of linear bisphenol molding polymers which possess excellent molding properties and a variety of other desirable physical properties to satisfy the requirements of the molded article.

It is convenient in discussing the polymers of this invention to describe the various components of the polymer after they have been incorporated into the polymer structure in terms of residues or the balance of what remains or what has been incorporated into the structure. Therefore, the term residue has been employed to identify that portion of the reactant which remains after the reactant's characteristic group, such as acid chloride, has been chemically reacted.

The polymers of this invention may be prepared by the melt, homogeneous or interfacial condensation techniques. Melt or bulk polymerization is the simplest method, wherein the reactants are charged to a vessel and heated. Homogeneous or solution polymerization generally offers better rate of reaction and temperature control than the melt process. Solubility of all reactants in a common solvent permits the reactants to be more thoroughly dispersed and resulting product is more conveniently handled. The interfacial technique provides means for maintaining the concentration of the reactants in the reaction zone at a constant level and has all the advantages of the homogeneous technique.

The polymers of the present invention are preferably prepared by an interfacial condensation technique. In the preferred process, the catalyst and water solution of an alkali metal salt of a bisphenol are charged to the reaction vessel. Thereafter, the diacid halide dissolved in a chlorinated hydrocarbon solvent is added with vigorous stirring to the bisphenolate solution. The reaction is then completed. Then the polymer solution is neutralized, the polymer washed and separated out.

In the preferred interfacial polycondensation technique according to the invention, alkali bisphenates are used which are obtained by dissolving the above bisphenols in water in the presence of at least equivalent amounts and preferably up to about 50 percent excess of alkali hydroxides such as sodium, rubidium, cesium, barium, or potassium hydroxides, an excess of about 30 percent is very satisfactory.

The polycondensation reaction may be carried out at temperatures between about minus 10 degrees centigrade and the boiling point of the organic solvent used, which may be as high as 150 degrees centigrade. Preferably 10 to 50 degrees centigrade will be employed. If a diacid halide is employed which is sensitive to hydrolysis, low polymerization temperatures and organic salts can be used to hold hydrolysis to a minimum.

It is an important advantage of the present invention that the reaction can be carried out at atmospheric pressure. However, less than atmospheric or greater than atmospheric pressure may be used.

The non-miscible solvents separately keep the chemical components and products in solution. The bisphenol and inorganic salts are dissolved in the aqueous phase and the diacid halide together with the polyester product, are in the non-aqueous phase. Additionally, the process proceeds to completion at a faster rate than other processes by which the polymers of this invention might have been made. Chlorinated hydrocarbon solvents have been found to be useful solvents for this reaction. The choice of solvent is determined by the solubility of the polymer in the solvent, the boiling point of the solvent and the stability of the solvent under basic conditions. The most useful solvents for this process are methylene chloride, and chloroform. Among other useful solvents are carbon tetrachloride, trichloroethylene, tetrachloroethylene, and monochlorobenzene. Aromatic compounds such as benzene, toluene and xylene may also be used. Water is preferably employed as the solvent for the alkali metal bisphenates.

According to the process of the invention, especially high molecular weight product is obtained if the reaction is carried out in the presence of a suitable catalyst such as a quaternary ammonium compound, tertiary sulfonium compound, quaternary arsonium compound or quaternary phosphonium compound. Suitable quaternary ammonium compounds, being soluble both in water and in the organic solvent used for the diacid halide, are those such as trimethylbenzylammonium chloride, triethylbenzylammonium chloride and dimethylethylbenzyl ammonium hydroxide. Suitable quaternary arsonium compounds are those such as trimethyloctyl arsonium iodide, methyltriphenylarsonium iodide, triphenyl-p-nitrobenzylarsonium bromide and triphenylbenzylarsonium chloride. Among the suitable quaternary phosphonium compounds are triphenylmethylphosphonium iodide, triphenylbenzylphosphonium chloride and ethylcyclopentamethylenephenylphosphonium acetate. Useful tertiary sulfonium compounds are those such as 2-hydroxyphenyldimethylsulfonium chloride, 3,5 - dihydroxyphenyldimethylsulfonium chloride, S,S' - p - xylene - bis(dihydroxyethyl)sulfonium bromide and hexamethylene - S,S' - bis(dimethyl) - 1,6-disulfonium bromide. These catalysts are generally added in amounts between 0.01 and 5 and preferably added in amounts between 1.8 and 3.8 percent calculated on the weight of the diacid halide used.

The color and clarity of the compositions of this invention are improved by excluding oxygen from the reaction vessel. Phenols and bisphenols upon slight oxidation discolor to a deep red. Since pronounced colors are hard to mask, the polymer to be most useful should be colorless or nearly colorless. Therefore, an inert or unreactive gas is employed to exclude oxygen from the reaction vessel. While it has been convenient to use nitrogen, suitable unreactive gases or mixtures may be employed including the inert gases such as argon, helium and neon.

The linear polyesters of the present invention are tough thermoplastic materials showing different melt viscosities depending upon the nature and the amount of alkyl substitution on the aromatic nucleus of the bisphenols but in any event less than the corresponding bisphenol diacid halide polyester. In this respect the former polyesters are superior to the latter which have found slight application on account of their melt viscosity. It is to be appreciated that the melt viscosity of the polymers of this invention may be further enhanced by employing mixtures of alkyl substituted bisphenols and/or diacid halides. In consequence of the lower melt viscosity of this invention the shaped articles produced therefrom are commercially feasible and have good mechanical properties.

Optionally small amounts of adjuvants or modifiers may be admixed with the polymers of this invention so that more useful articles may be obtained. Thus, dyes and pigments for different colors, waxes and stearates for mold flow and mold release, and inert fillers may be added to modify physical properties.

The melt viscosity of the polymers of the invention does not generally exceed 1,000,000 poises at 300 degrees centigrade, and preferably does not exceed about 100,000 poises as measured by American Society for Testing Materials (ASTM) Procedure D1238–57T. More preferably, the melt viscosity is less than 50,000 poises.

Because the polymers of the invention are thermoplastic, they can be worked up into useful articles by applying fabrication techniques known in the art such as compression or injection molding, vacuum forming, extrusion, solvent coating and fiber spinning. The actual times, pressures and temperatures of fabrication are dependent upon the method of making, and the size and shape of the article.

The practice of this invention is illustrated but not limited by the examples given below. Temperature is expressed in degrees centigrade unless otherwise noted.

Example 1

3,3' - dimethyl - 4,4' - dihydroxydiphenyl - 2,2 - propane (0.05 mol), was dissolved in 100 milliliters of 1.05 molar aqueous sodium hydroxide solution in a 500 ml., 3-necked Morton flask equipped with water cooled condenser, and stirrer, thermometer, nitrogen gas inlet (condenser used as outlet), and compensating addition funnel. Benzyltrimethylammonium chloride (0.0015 mol) as a quaternary catalyst and p-tertbutylphenol (0.0005 mol) as a chain terminator were added to the reaction flask along with 85 ml. of methylene chloride as the organic solvent. Isophthaloyl chloride (0.05 mol) was dissolved in 40 ml. of methylene chloride and placed in the addition funnel. With vigorous stirring the diacid chloride was added to the bisphenol reaction mixture over a period of seven minutes at 15–23 degrees. The reaction mixture was under a nitrogen atmosphere and was stirred for one hour at room temperature, then precipitated in an excess of acetone to yield a lumpy solid. The precipitate was ground up in a blender using water as a washing agent until no chloride was detected, by silver nitrate solution. After drying, a polymer exhibiting an intrinsic viscosity of 0.64 dl./g. in s-tetrachloroethane at 30 degrees centigrade was obtained. This polymer was then further purified by dissolving the dry polymer in methylene chloride, this organic solution was stirred with an aqueous sodium hydroxide solution (4.75 percent by weight sodium hydroxide) for 3.0 hours, the organic solution was then separated and washed three times with 50–50 hydrochloric acid (concentrated) water solution, and finally was extracted several times with water to wash out sodium chloride and hydrogen chloride. The polymer solution was then reprecipitated in acetone and the polymer was dried. The intrinsic viscosity had been increased to 1.26 dl./g. in s-tetrachloroethane at 30 degrees for the reprocessed polymer. A melt viscosity determination at 300 degrees was made using the Tinius Olsen viscometer and the melt viscosity of the polymer was found to be approximately one-half the melt viscosity of the corresponding (4,4'-dihydroxydiphenyl-2,2-propane)polyisophthalate at the corresponding intrinsic viscosity levels. Small containers, knobs and other useful objects are prepared by injection molding of the resin of this example at 300 degrees.

Example 2

Isophthaloyl chloride (0.100 mol) and diethylene glycol (0.030 mol) were charged into a 500 ml., 3-necked Morton flask equipped with a stirrer and a nitrogen gas inlet and outlet. A continuous flow of dry nitrogen gas was passed through the reaction flask while stirring and the flask was heated by means of a steam bath for three hours. Ninety-eight percent of the theoretical quantity of hydrogen chloride had evolved at the end of heating. Water (50 ml.), methylene chloride (270 ml.) and benzyltrimethylammonium chloride (0.003 mol) were charged into the reaction flask containing the diethylene glycol isophthaloyl chloride residue. A compensating addition funnel was installed on the reaction flask and a solution consisting 0.073 mole of 2,3'-dimethyl-4,4'-dihydroxydiphenyl-2,2-propane (0.073 mol) dissolved in 200 ml. water and 0.190 mole NaOH was added to the funnel. The bisphenol solution was added to the reaction flask over a period of ten minutes accompanied by vigorous stirring at temperatures ranging from room temperature up to the reflux temperature of methylene chloride. The reaction mixture was then stirred for an additional thirty minutes at room temperature. A continuous flow of nitrogen gas was maintained during the interfacial reaction. At the end of thirty minutes of stirring, 100 milliliters aqueous hydrochloric acid (50 percent by volume) and methylene chloride (500 ml.) were added to the reaction flask and the mixture was stirred briefly. The flask contents were poured into a separatory funnel and, after removal of the acid layer, the organic phase containing the copolymer was washed free of chloride with distilled water and the copolymer solution was precipitated in an excess of n-hexane. The solid copolymer was then ground up and washed in a blender using distilled water. After drying an intrinsic viscosity of 0.79 dl./g. in s-tetrachloroethane at 30 degrees was found for the copolymer. A melt viscosity of 11,000 poises was found for this copolymer at 275 degrees centigrade as compared to a melt viscosity of 41,000 poises at the same temperature found for the corresponding copolymer prepared from bis(4-hydroxyphenyl)-2,2-propane. The resin of this example is suitable for molding small articles by injection molding techniques at 275 degrees.

Example 3

Using the process of Example 2, terephthaloyl chloride (0.100 mol), neopentyl glycol (0.040 mol) and 3,3'-dimethyl-4,4'-dihydroxydiphenyl-2,2-propane (0.060 mol) were reacted to form a copolymer. After washing and drying an intrinsic viscosity of 0.81 dl./g. in s-tetrachloroethane at 30 degrees was found. A portion of this copolymer was extruded in a Tinius Olsen viscometer at 275 degrees and subjected to hydrolytic stability tests.

An additional polymer was prepared using the procedure, reactants and mole ratios of Example 3 except that 4,4'-dihydroxydiphenyl-2,2-propane was used instead of 3,3'-dimethyl-4,4'-dihydroxydiphenyl-2,2-propane. The resulting copolymer was extruded in a Tinius Olsen viscometer at 275 degrees. The extrudate (designated BPA in the table below) was subjected to hydrolytic stability tests.

Copolymers were tested for hydrolytic stability by immersing samples in distilled water maintained at 100 degrees. After designated periods of immersion the samples were removed from the water and their intrinsic viscosity determined. The intrinsic viscosities were determined in s-tetrachloroethane at 30 degrees.

INTRINSIC VISCOSITY

| Copolymer | Days After Immersion | | |
|---|---|---|---|
| | 0 | 11 | 21 |
| Example 3 | 0.73 | 0.63 | 0.4 |
| BPA | 0.76 | 0.35 | 0.14 |

It can be seen that the hydrolytic stability of the polymer prepared from 3,3'-dimethyl-4,4'-dihydroxydiphenyl-2,2-propane is considered better than that prepared from the unsubstituted bisphenol.

Various changes and modifications may be made in the method and apparatus of this invention and in the mole ratio of the polymers of this invention, certain preferred ones which have been herein described without departing from the scope and spirit of this invention. These modifications are to be regarded as within the scope of this invention.

What is claimed is:

1. A linear, high molecular weight polyester, having an intrinsic viscosity of at least 0.40 deciliter/gram when measured in sym-tetrachloroethane at 30 degrees centigrade, of components consisting essentially of (A) a diacid halide of the formula X—Y—(Z)$_n$—Y'—X wherein Z is a bivalent radical selected from the group consisting of alkylene, arylene, cycloalkylene and alkylarylene; Y and Y' are independently selected from the group consisting of CO, SO and SO$_2$; X is halogen and $n$ is an integer from 0 to 1, and (B) dihydroxy compounds wherein from 40 to about 70 mole percent of the dihydroxy compound is a bisphenol of the formula:

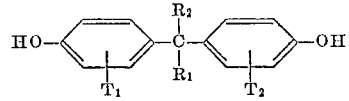

wherein T$_1$ and T$_2$ are alkyl of 1 to 6 carbon atoms; and R$_1$ and R$_2$ are independently selected from the group consisting of alkyl, cycolalkyl and phenyl, and the balance of dihydroxy compound is a saturated aliphatic glycol.

2. A linear, high molecular weight polyester, having an intrinsic viscosity of at least 0.40 deciliter/gram when measured in sym-tetrachloroethane at 30 degrees centigrade, of components consisting essentially of isophthaloyl chloride and dihydroxy compounds, wherein 40 to about 70 mole percent of the dihydroxy compound is 3,3'-dimethyl-4,4'-dihydroxydiphenyl-2,2-propane, and the balance of dihydroxy compound is diethylene glycol.

3. A linear, high molecular weight polyester, having an intrinsic viscosity of at least 0.40 deciliter/gram when measured in sym-tetrachloroethane at 30 degrees centigrade, of components consisting essentially of terephthaloyl chloride and dihydroxy compounds, wherein 40 to about 70 mole percent of the dihydroxy compound is 3,3'-dimethyl-4,4'-dihydroxydiphenyl-2,2-propane, and the balance of dihydroxy compound is neopentyl glycol.

4. A process for preparing a linear, high molecular weight polyester, having an intrinsic viscosity of at least 0.40 deciliter/gram when measured in sym-tetrachloroethane at 30 degrees centigrade, of components consisting essentially of (A) a diacid halide of the formula X—Y—(Z)$_n$—Y'—X wherein Z is a bivalent radical selected from the group consisting of alkylene, arylene, cycloalkylene and alkylarylene; Y and Y' are independently selected from the group consisting of CO, SO and SO$_2$; X is halogen and $n$ is an integer from 0 to 1, and (B) dihydroxy compounds wherein from 40 to about 70 mole percent of the dihydroxy compound is a bisphenol of the formula:

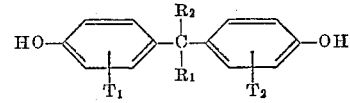

wherein T$_1$ and T$_2$ are alkyl of 1 to 6 carbon atoms and R$_1$ and R$_2$ are independently selected from the group consisting of alkyl, cycloalkyl and phenyl, and the balance of dihydroxy compound is a saturated aliphatic glycol; consisting essentially of:

dissolving a reaction product of components consisting essentially of said diacid halide and said saturated aliphatic glycol in a chlorinated hydrocarbon solvent, and reacting the resultant solution with an aqueous solution of an alkali metal salt of said bisphenol as the sole reactant in said aqueous solution.

5. The process according to claim 4 wherein a catalyst is employed and adding said catalyst along with the bisphenol.

6. The process according to claim 5 wherein benzyltrimethylammonium chloride is employed as the catalyst.

7. The process according to claim 4 wherein the reaction vessel is charged with inert gas to the exclusion of oxygen from the vessel.

8. The process according to claim 4 wherein the reaction vessel is charged with nitrogen to the exclusion of oxygen from the vessel.

References Cited

UNITED STATES PATENTS

| | | | |
|---|---|---|---|
| 3,110,698 | 11/1963 | Laakso et al. | 260—47 |
| 2,973,339 | 2/1961 | Muenster | 260—47 |
| 3,133,898 | 5/1964 | Keck | 260—47 |
| 3,216,970 | 11/1965 | Conix | 260—47 |
| 3,161,615 | 12/1964 | Goldberg | 260—47 X |
| 3,169,121 | 2/1965 | Goldberg | 260—47 X |
| 3,227,684 | 1/1966 | Conix et al. | 260—49 |
| 3,230,195 | 1/1966 | Conix | 260—49 |
| 3,236,808 | 2/1966 | Goldberg et al. | 260—47 |

FOREIGN PATENTS

| | | |
|---|---|---|
| 772,627 | 4/1957 | Great Britain. |
| 897,640 | 5/1962 | Great Britain. |
| 863,704 | 3/1961 | Great Britain. |
| 870,095 | 6/1961 | Great Britain. |
| 1,198,715 | 6/1959 | France. |

OTHER REFERENCES

S.P.E. Journal, June 1959, article by Morgan, "Interfacial Polycondensation," pp. 485–495.

WILLIAM H. SHORT, *Primary Examiner.*

L. P. QUAST, *Assistant Examiner.*